United States Patent [19]

Horowitz

[11] 4,077,870
[45] Mar. 7, 1978

[54] METHOD FOR ELECTRICALLY CRACKING PETROLEUM CRUDE

[75] Inventor: Martin Horowitz, Berkeley, Calif.

[73] Assignee: George B. Saviers, Jr., San Francisco, Calif.

[21] Appl. No.: 604,960

[22] Filed: Aug. 15, 1975

Related U.S. Application Data

[62] Division of Ser. No. 425,713, Dec. 18, 1973, Pat. No. 3,902,071.

[51] Int. Cl.$^2$ .......................... C07C 3/26; B01K 1/00; C07C 3/34
[52] U.S. Cl. ................................... 208/128; 204/168; 204/172; 208/125
[58] Field of Search ....................... 204/168, 170–172; 208/125, 128

[56] References Cited

U.S. PATENT DOCUMENTS

| | | | |
|---|---|---|---|
| 1,222,402 | 4/1917 | Hirt | 204/172 UX |
| 2,583,898 | 1/1952 | Smith | 204/168 |
| 2,791,548 | 5/1957 | Benz | 208/128 X |
| 3,051,639 | 8/1962 | Anderson | 204/171 |
| 3,227,642 | 1/1966 | Lernelson | 204/172 X |
| 3,663,394 | 5/1972 | Kawahara | 204/168 |
| 3,855,339 | 12/1974 | Hosoi et al. | 260/683 R |

FOREIGN PATENT DOCUMENTS 1,033,534  7/1953  France ................................ 204/172

*Primary Examiner*—F.C. Edmundson
*Attorney, Agent, or Firm*—Bruce & McCoy

[57] ABSTRACT

A method for electrically cracking crude oil comprised of the steps of injecting a mixture of petroleum crude and an energy transfer medium into a cracking chamber in a continuous flow, supplying a high frequency electrical discharge into the energy transfer medium which, in turn, consecutively transmits the energy to the petroleum crude for cracking, and extracting and storing the component hydrocarbon fractions while separating out the energy transfer medium.

6 Claims, 2 Drawing Figures

METHOD FOR ELECTRICALLY CRACKING PETROLEUM CRUDE

This is a division of application Ser. No. 425,713, filed Dec. 18, 1973, now U.S. Pat. No. 3,902,071.

FIELD OF INVENTION

The present invention relates to the cracking of petroleum crude and more particularly to a method for electrically cracking petroleum crude.

DESCRIPTION OF PRIOR ART

Petroleum crude is a substance found in nature which can be broken down into varied and extremely useful products. Each crude molecule consists of a very large grouping, or chain, of carbon and hydrogen atoms. This molecule is called a hydrocarbon molecule and can be broken into smaller hydrocarbon molecules of different lengths, called fractions, to form numerous useful products such as gasoline, benzene, propylene, and methylene, depending on the molecular length of the resulting fraction. The process of breaking the crude molecule into smaller hydrocarbon molecules or fractions is called "cracking".

The method of cracking crude which is presently used worldwide consists of heating a batch of crude at a pressure as much as eight to ten times atmospheric pressure and at temperatures generally ranging between 400° C to 500° C. Temperatures which exceed 450° C, however, tend to destroy the crude molecule whereby only hydrogen and methane gas and tar are produced. Higher operating pressures are limited by safety and cost.

Thermal cracking, that is, cracking by directly heating the petroleum crude typically involves pumping the crude into a large steel vessel, called the cracking chamber, measuring anywhere from 50 to 100 feet in length and 30 to 40 feet in diameter. To promote cracking, a platinum catalyst is added usually by depositing the platinum on glass or ceramic particles which are suspended in the cracking chamber. The catalyst allows the crude to be cracked at lower temperatures, thereby, reducing the percentage of waste products formed, and consequently, increasing the output of useful fractions.

The mechanism by which platinum enhances the cracking process is not clearly understood. Hydrogen is soluable in platinum and it is believed that the molecules of gaseous hydrogen and exterior hydrogen atoms of the hydrocarbon molecules are absorbed by the platinum and then emmitted with additional energy imparted as a result of their dissolved condition. At a suitable temperature this additional energy when communicated to the carbon-carbon bonds is sufficient to cracking the crude molecule.

In the presently used thermal cracking method, the petroleum crude must be cooked at high pressure for a minimum of one hour and, as hereinabove described, in the presence of a platinum catalyst. A major disadvantage of this prior art method is that heat and pressure causes much of the natural crude to be wasted by producing an excess of commercially useless hydrogen and methane gas and charcoal and pitch. This is because there is little control over where in the long hydrocarbon chain the crude molecule is cracked; energy is distributed in an unregulated almost randon fashion and as a result fractionates the crude into numerous petroleum products corresponding to the different lengths of the fraction molecules. Certain temperatues and pressures favor certain end products. However, given optimum conditions relative to a desired fraction, the waste is still considerable. Moreover, even among the commercially usable fractions, it may be economically, technically, or even socially desireable to emphasize a particular useful fraction in preference to others. The particularly can be seen during periods of fuel shortages where it may be imperative to increase the production of one of the particular fractions such as gasoline or home heating fuel.

The method and apparatus of the present invention overcomes the problem of inefficient thermal cracking by providing a means for evenly distributing energy in measured amounts throughout the petroleum crude to produce a controlled break in the crude molecule. In particular, it uses electrical energy in the presence of an energy transfer medium instead of unregulated thermal energy. The resulting decreased incidence of waste products constitutes a tremendous economic saving and a tremendous savings in terms of preserving natural resources, an area of major concern throughout the world today.

Another advantage of the present invention over the prior art is that it allows continuous as opposed to batch processing. This capability not only will increase the level of production, but will also decrease the time lost due to "down time" which is the time required to periodically clean the cracking chamber. By continuously introducing and extracting crude into and from the cracking chamber, the necessity for large cracking chambers for holding large batches of crude is eliminated allowing the use of smaller chambers. Moreover, if an auxillary cracking chamber is provided, the crude could be diverted while the main chamber is being cleaned without interrupting the cracking process.

A major expense in the prior art method of cracking crude is in the purchase of the platinum catalyst, platinum being an extremely rare metal. Presently, the major source of platinum is the Soviet Union although a few reserves are known to exist in South America and South Africa. As long as no substantial supply of platinum can be found in the western world, the supply to United States oil refineries is highly susceptible to Soviet-American relations. The price of this precious metal usually runs anywhere from 3½ to 4½ times the regulated price of gold and the annual expenditure for it by U.S. oil companies runs into the billions of dollars. Therefore, it is difficult to overstate the impact and desireability of a method for cracking crude which eliminates the need for the platinum catalyst without significantly increasing waste by-products, that is, without lowering the efficiency of the cracking facility.

The method and apparatus of the present invention solves the problem of how to crack crude efficiently without using a platinum catalyst. It eliminates the need for a catalyst altogether by providing a method of supplying energy from an electrical discharge sufficient to crack the crude molecule, a method which is considerably more efficient when compared with the catalytic method of the prior art.

Because the method of the present invention can be achieved at low pressures and at comparatively low temperatures, the cost of capital equipment will be substantially reduced. This, of course, is an important consideration, especially in the oil industry where the capital investment required to build cracking plants is tremendous.

Therefore, the present invention is a very novel and unique method and apparatus which, by increasing the efficiency of cracking petroleum crude, provides a long awaited step toward solving the problem of the world's dwindling sources of natural fuels. It will also sharply reduce the cost of building and operating a petroleum cracking plant.

SUMMARY OF INVENTION

The present invention consists of a method and apparatus for electrically cracking crude. The method comprises the following steps:

(1) Mixing an energy transfer medium with the petroleum crude to be cracked.

(2) Particalizing the mixture generated by step 1.

(3) Continuously introducing the particalized mixture into a cracking chamber by applying a high frequency electrical discharge to the energy transfer medium from an electrode whereby the energy transfer medium consecutively transmits the energy received from the discharge to the crude molecules to cause the controlled cracking thereof.

(4) Extracting the fractionated petroleum crude and energy transfer medium from the cracking chamber.

(5) Separating out the energy transfer medium from the cracked crude fractions.

(6) Separating the remaining various crude fractions into component fractions for storage.

OBJECTS OF INVENTION

It is therefore an important object of the present invention to provide a method and apparatus for cracking petroleum crude which uses electrical rather than thermal energy.

It is another object of the present invention to provide a method and apparatus for cracking petrolem crude using a continuous process instead of a batch process.

It is a further object of the present invention to provide a method and apparatus for cracking crude which increases the efficiency of cracking crude by sharply reducing the production of unwanted hydrocarbon fractions.

It is still another object of the present invention to provide a method and apparatus for cracking crude which eliminates the necessity of using a costly platinum catalyst.

It is still a further object of the present invention to provide a method and apparatus for cracking crude which preferentially discharges electrical energy into an energy transfer medium whereby the energy transfer medium consecutively gives up energy in a controlled manner to the crude molecules for the cracking thereof.

It is yet another object of the present invention to provide a method and apparatus for cracking crude which operates at low pressures and temperatures.

And it is yet a further object of the present invention to provide a method and apparatus for cracking crude which sharply reduces operational costs and capital expenditures.

DESCRIPTION OF THE PREFERRED EMBODIMENT

Figure 1:
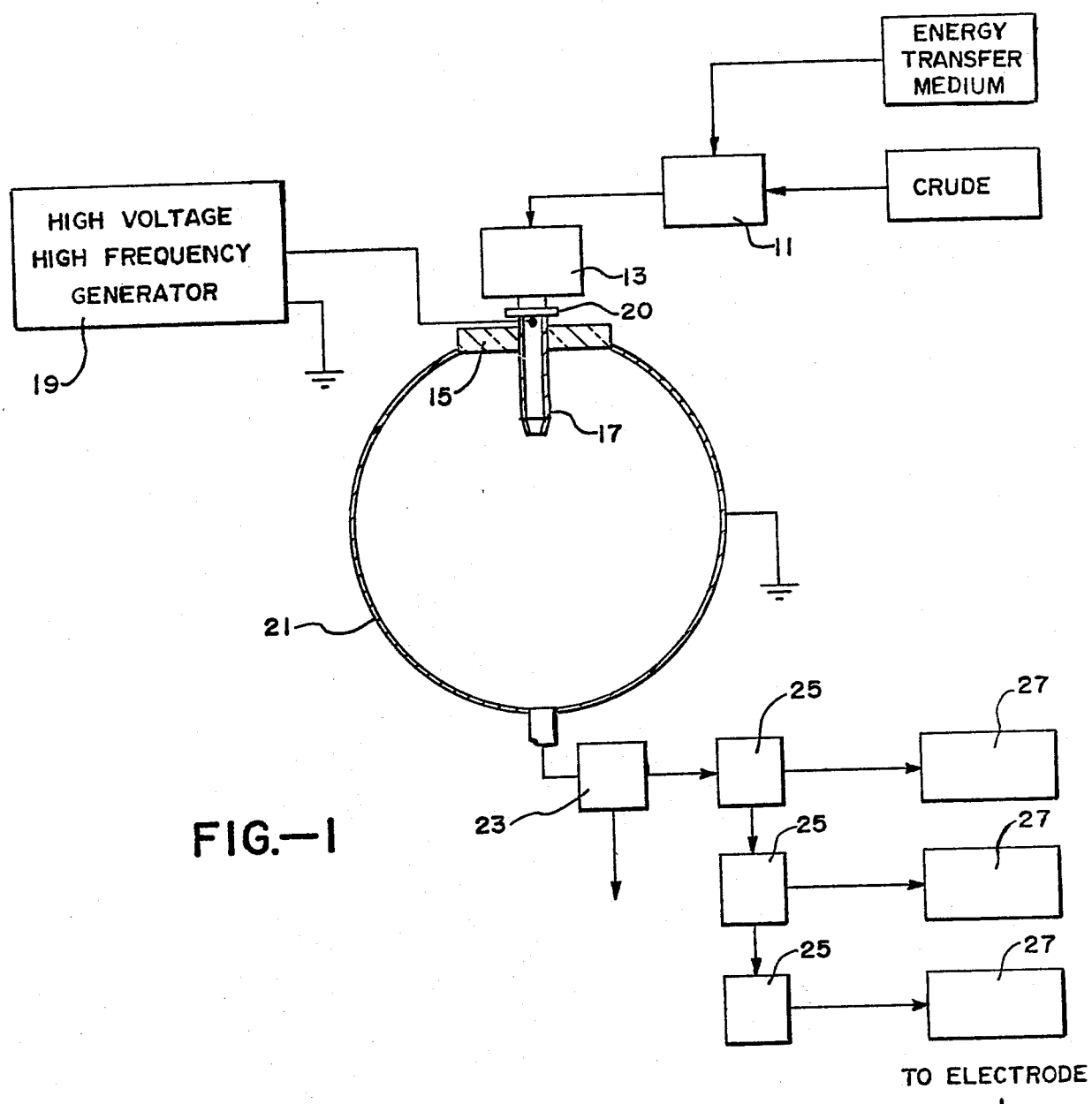
FIG. 1 is a cut away view showing a single electrode projecting through a quartz disc into a cracking chamber, a means for mixing crude with an energy transfer medium and for introducing that mixture into the cracking chamber, and a means for extracting the cracked fractions and energy transfer medium mixture from the cracking chamber.

The present invention provides a method and apparatus for taking unusable petroleum crude and electrically cracking it into various useful hydrocarbon fractions. Electrical cracking is achieved by discharging electric energy into an energy transfer medium dispersed in the crude molecules. The energy discharge medium then gives up the energy acquired from the discharge to the crude molecules.

The first step of the method is to mix the petroleum crude to be cracked with an additive substance called an energy transfer medium. It is possible to electrically crack crude without using such a medium by producing an electric arc between two electrodes such that the arc travels through the crude to be cracked. However, such a method is extremely inefficient because the energy supplied by the arc is not evenly distributed, but is confined to a very small region immediately surrounding the arc. The result is that only a small percentage of the crude receives energy sufficient for cracking and in a manner that is uncontrollable and does not produce a predictable or uniform product. The energy transfer medium, on the other hand, functions in a very unique way in that it evenly passes a measured quantum of energy to all of the crude molecules.

In order to achieve a uniform distribution of energy, the energy transfer medium must be evenly distributed in the crude oil. None of the energy in the electrical transfer goes directly to the crude molecule, as is the case with an electric arc, but is preferentially transmitted to the additive atoms of the energy transfer medium. The additive atoms, excited by the electric discharge, then impart their energy to the crude molecule causing those molecules to crack into fragments. The particular fragment lengths, that is to say, the petroleum end products, are determined by the amount of energy given to the crude molecule.

The additive atom, or energy transfer medium, can be any one of the rare gases such as helium, neon, argon, kryton or xenon, or in some instances the vapors of some alkali metals such as lithium, sodium, potassium, rubidiun. By selecting an additive atom with a low ionization energy compared with the ionization energy of the hydrogen and carbon atoms in the hydrocarbon molecule chain of the crude to be cracked, the electrical energy preferentially goes to the additive atom. Having been taken up by the additive atom, the energy is then transferred in a controlled way to the crude molecules via atomic collisions with the crude molecules, with the number of collisions being predicted by the gas laws given the temperature and pressure.

The amount of energy that is accepted by the additive atoms, and thus the amount which is available to be given up to the crude molecule, depends on the atomic structure of the additive atom. For example, neon would have a slightly higher energy band available than would argon. The amount of energy which can be accepted and given up is very specific; this fact provides for a controlled cracking process heretofore unknown in the art. Because of this controlled process, the present invention greatly reduces the waste created by the production of unwanted fractions.

The amount of energy transfer medium that should be mixed with petroleum crude will depend on both the species of additive atom used and the hydrocarbon fractions desired as an end product. Depending upon these variables, the mixture ratio of energy transfer medium to petroleum crude by weight will vary from 1:100 to 1:1000.

After mixing the energy transfer medium with the petroleum crude, the mixture is particalized so that it can more readily absorb the electrical discharge. Particalization can be any process which separates the liquid crude into fine particles of very small dimensions such as by spraying or vaporization. Particalization could take place before mixing by first particalizing both the crude and the additive atom species separately. Particalizing can be done in successive steps or possibly in a single step, but there are many ways to accomplish this step in the process and any method which effects adequate particalization can be employed.

The particalized mixture of crude and energy transfer medium is fed in a continuous flow into a reaction or cracking chamber. As the mixture is fed into the chamber it is supplied with an electrical discharge. Energy preferentially flows to the energy transfer medium and then, in turn, is transmitted to the petroleum crude for cracking.

FIG. 1 shows that in the preferred embodiment the means for introducing the crude and transfer medium mixture into the chamber includes a hollow metal electrode 15 which protrudes into the chamber. A nozzle is provided on the projecting end of this electrode to spray the mixture into the chamber. The nozzle is preferably of a type which will finely divide the mixture as it emerges from the electrode so as to particalize the mixture. It is possible that this nozzle will be sufficient to both mix and particalize the mixture if the components are fed to it in the proper proportions.

The system does not necessarily include a physical second electrode as is the case with conventional electrical discharge systems. It is believed that the mixture of cracked or uncraked petroleum crude and the energy transfer medium continuously passing through the reaction chamber are in effect the second electrode and form an energy absorbing load which discharges electrical energy into a gaseous medium giving the appearance of a single electrode system.

It has been found that the optimum discharge characteristics, i.e., the maximum energy transfer, occurs when electrical energy is supplied to the energy transfer medium at a frequency roughly between 50MHz and 150MHz. Hence, in the preferred method, the electric discharge occurs within this frequency range. It is not crucial that a particular frequency be maintained within this broad range and, in fact, since the presentation of a relatively constant input power is important, the frequency of the power source can be allowed to float, that is, to be pulled by variations in the load presented to the frequency generator.

The power requirement for electrically cracking crude is directly proportional to the flow of the reaction materials through the cracking chamber. Therefore, if the production volume of a system using the present method of cracking crude is to be increased, which means increasing the flow of reactive materials, the power that must be supplied to the electrode must also be proportionally increased.

The discharge of electrical energy into the energy transfer medium actually occurs in a region proximate the end of the single electrode through which the petroleum crude is injected into the cracking chamber. The particalized mixture emerges from the electrode directly into this reactive region and is kicked by an electrical discharge whereby the energy transfer medium builds up a reservoir of energy. As the mixture continues to flow out of the discharge region and into the cracking chamber the energy preferentially received by the additive atoms is given up the crude by collision with the crude molecules.

The electrical discharge depresses the voltage at the electrode until it reaches a certain critical value at which time the discharge actually terminates. Because of this phenomenon and because it requires a relatively high voltage to initiate a discharge, the electrical discharge to the energy transfer medium is pulsating rather than continuous. The electrode rapidly charges and discharges at a rate determined by the time constant of the electrode's equivalent circuit. The pulse frequency in a 5000 watt system has been observed to be roughly 20,000Hz. Since the rate of flow of the reactive mixture is insignificant when compared with the pulse frequency, the "turnoff" time is not long enough to allow portions of the crude mixture to be passed through the system without being cracked. The discharge, therefore, is effectively continuous.

It is believed that the discharge region is quite small when compared with the total size of the cracking chamber, probably less than 10% of the total volume. On the other hand, the actual cracking, that is, the process of the energy transfer medium giving up its energy to the crude molecules, takes place over a somewhat larger volume, but concludes well before the mixture is extracted from the chamber.

In the preferred method of the present invention, only one electrode is used; however, a single electrode is taken to means any group or crown of electrodes at the same potential wherein each electrode of the crown would be driven by the same power supply and each would be designed to serve as a means for injecting the mixture of petroleum crude and energy transfer medium into the cracking chamber.

The method of the present invention further includes the continuous extracting of the processed mixture of the component fractions of the cracked petroleum crude and the energy transfer medium from the cracking chamber. This mixture can be extracted by pumping it out of the chamber through suitably placed valves in the cracking chamber though a pump is not necessarily required.

Once the above described mixture is removed from the chamber, the energy transfer medium is separated from the fractions of the crude hydrocarbon molecules produced by the cracking process. The fractions which remain after removing the additive atoms are then, in turn, separated into their individual components and stored. Separation of the component fractions may be accomplished by presently utilized equipment by the process of distillation.

An apparatus for electrically cracking the petroleum crude is also provided by the present invention. This apparatus comprises a reaction or cracking chamber and a means for introducing into and extracting from the chamber the petroleum crude or fractions mixed with the energy transfer medium. The cracking chamber is an enclosed metal chamber having at least two openings through which the crude and energy transfer medium mixture can be injected and extracted. The chamber would typically be a copper sphere, although other shapes and materials could be utilized; the volume of the chamber would vary depending on the designed capacity of the cracking apparatus.

Referring to FIG. 1, the means for introducing the crude additive atom mixture includes a means 11 for mixing the additive atom species in appropriate proportion with the crude. It also includes a means 13 for particalizing the mixture such as by producing a very fine spray or by vaporization. The latter can be accomplished by boiling the mixture and injecting it into the chamber. It is important to note that mixing and particalization can be accomplished in any order or in one operation.

An insulator 15 is inserted in the hole in the chamber through which the combination electrode and injection nozzle is inserted and contains a center bore to accommodate the electrode. The insulator is hermetically sealed to both the chamber and the electrode and spaces the two so as to electrically insulate one from the other. In the preferred embodiment, the disc has been fabricated from silicon dioxide (quartz), however, other insulating materials may also be used.

The apparatus of the present invention includes means for supplying an electrical dishcarge to the energy transfer medium as it is being introduced into the cracking chamber. Such means includes a hollow electrode 17, which is fabricated from a highly conductive material. Such means further includes a frequency generator 19 which is connected to the electrode 17 and which is designed to supply the required power and frequency. An insulator 20 is suitably located to insulate the hollow electrode 17 from the apparatus supplying the crude and energy transfer medium while at the same time allowing these reactive materials to flow into and through the hollow electrode.

The frequency generator 19 consists of power supply and an oscillator circuit directly loaded through the electrode into the available atmosphere and the reactive materials flowing through the system. Load changes in the discharging system will, thus, pull the oscillator frequency until the internal impedance of the oscillator matches the load impedance. This allows for maximum power transfer to the energy transfer medium. Within the above specified range, the frequency at which the system operates has been found to have an insignificant effect on the efficiency of the cracking process.

Figure 2:
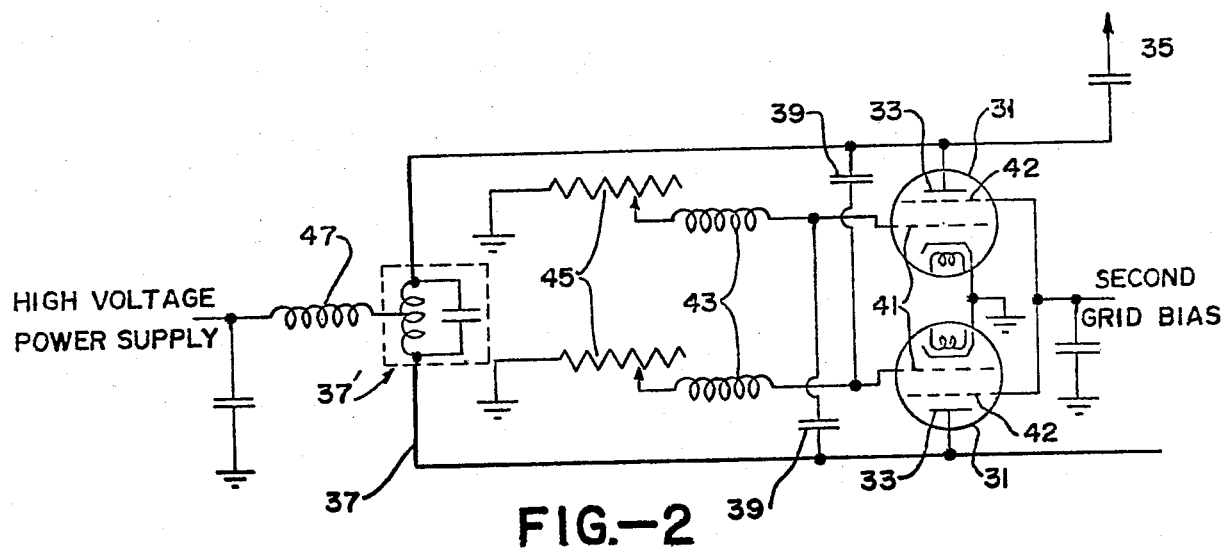
FIG. 2 is a schematic view showing the oscillator circuit of the frequency generator.

An example of an oscillator circuit used in a low volume prototype system is shown in FIG. 2. It includes a 1000 watt push-pull high frequency oscillator having two Eitel-McCullough 4 CX 300A tetrodes 31 whose anodes (33) are connected to a common #6 gauge copper wire. The #6 copper wire is coupled at one end through capacitor 35 to the hollow electrode which projects into the cracking chamber. The tuning of the free running oscillator is controlled by a resonant circuit 37 in the plate circuit of the two tetrodes consisting of two parallel lengths of the #6 copper wire each generally 12 to 18 inches in length, spaced 6 inches apart and shunted at one end by an additional length of #6 copper wire. The plate circuit 37 thus forms a rectangle open at one end and having a parallel capacitor/inductance equivalent circuit 37; there is feedback through a 50 uuf, 25 K.V. capacitor 39 from the first grid 41 of each tetrode to the anode 33, or plate, of the opposite tetrode. The grid circuit for the first grid of each tube also consists of a 50 uh inductance 43 and a zero to 3000 ohm variable resistance 45 connected in series to ground. An A.C. filament supply and a D.C. second grid supply capactively coupled to ground is also provided. The output of the high voltage D.C. power supply which drives the oscillator is connected through a choke inductance 47 to the plate circuit. The second grid 42 of each tetrode is connected to a bias supply voltage which can be varied between zero and 300 volts D.C.

Means for extracting the processed mixture from the cracking chamber is provided. Such means may simply consist of an outlet in the chamber through which, due to gravitational forces and pressure differentials, the liquid end products may flow. The means for extraction may, however, further consist of a pumping unit.

Referring to FIG. 1, means 23 for removing the energy transfer medium is connected to the output of the chamber and to this is connected a means 25 for separating the various fractions of the hydrocarbon molecule produced by the cracking process. Ideally only two fractions would exist as a result of a single crack in the hydrocarbon molecule, however, such a condition is unrealizable in practice. Generally, several fractions will predominate with these particular fractions being predetermined by the selection of the additive atom. The production of some residual undesired fractions is unavoidable using the present invention, but is insignificant when compared with the wastefulness of the random crack caused by presently used methods. The means 25 for separating fractions will generally include a distillation column though other means of separation may also be used. It will also generally include a condenser unit. Storage reservoirs 27 are also provided such that the separated fractions can be stored for shipment.

Cracking petroleum crude using this method and apparatus of the present invention provides a great advantage over the prior art in that cracking can generally be achieved at pressures no higher than three atmospheres as compared with the eight to ten atmospheres used in the prior art method, and in the comparatively low temperature range of 100° C to 250° C. Also, by using the method of the present invention, the petroleum crude molecule is cracked in a controlled manner, without the use of a platinum catalyst such that most of the resulting component fractions predominately consist of the desired end products. The resulting low percentage of waste products, that is, unusable hydrocarbon fractions, contracts with the high degree of waste produced using present batch processing methods. Different useful fractions can be emphasized simply by varying the additive atom species.

While the method and apparatus of the present invention has been described above in considerable detail, it should not be limited to such detail except as is necessary by the appended claims.

I claim:

1. A method for cracking petroleum crude comprising the steps of mixing an energy transfer medium selected from a group consisting of helium, neon, argon, krypton or xenon while the crude to be cracked, the atoms of said energy transfer medium having a low ionization energy compared with the ionization energy of the hydrogen and carbon atoms of the hydrocarbon molecule chain, the additive atoms of said energy transfer medium being selected according to which hydrocarbon fractions of the cracked crude are to be preferentially produced, injecting said mixture into a cracking chamber in a continuous flow and in particalized form, supplying an electrical discharge to said energy discharge medium, said electrical discharge being supplied at a relatively constant power with a floating high frequency whereby the energy transfer medium absorbs the energy contained in the high frequency electrical discharge and transmits it to the molecules of crude which are thereby controllably cracked into various fractions, extracting the cracked crude and energy transfer medium continuously from said chamber, separating the transfer medium from the cracked crude, and distilling the cracked crude into its component hydrocarbon fractions for storage.

2. The method of claim 1 wherein the high frequency of said electrical discharge is allowed to float generally between 50 MHz and 150 MHz which floating frequency is dependant upon the energy absorbing load presented by said particalized mixture of crude and energy transfer medium flowing through said cracking chamber.

3. The method of claim 1 where said energy transfer medium and said petroleum crude are mixed by weight in a ratio of between 1:100 and 1:1000.

4. A method for cracking petroleum crude comprising the steps of mixing an energy transfer medium selected from a group consisting of the vapors of lithium, sodium, potassium or rubidium with the crude to be cracked, the atoms of said energy transfer medium having a low ionization energy compared with the ionization energy of the hydrogen and carbon atoms of the hydrocarbon molecule chain, the additive atoms of said energy transfer medium being selected according to which hydrocarbon fractions of the cracked crude are to be preferentially produced, injecting said mixture into a cracking chamber in a continuous flow and in particalized form, supplying an electrical discharge to said energy discharge medium, said electrical discharge being supplied at a relatively constant power with a floating high frequency whereby the energy transfer medium absorbs the energy contained in the high frequency electrical discharge and transmits it to the molecules of crude which are thereby controllably cracked into various fractions, extracting the cracked crude and energy transfer medium continuously from said chamber, separating the transfer medium from the cracked crude, and distilling the cracked crude into its component hydrocarbon fractions for storage.

5. The method of claim 4 wherein the high frequency of said electrical discharge is allowed to float generally between 50MHz and 150 MHz which floating frequency is dependent upon the energy absorbing load presented by said particalized mixture of crude and energy transfer medium flowing through said cracking chamber.

6. The method of claim 4 wherein said energy transfer medium and said petroleum crude are mixed by weight in a ratio of between 1:100 and 1:1000.

* * * * *